Figure 1:
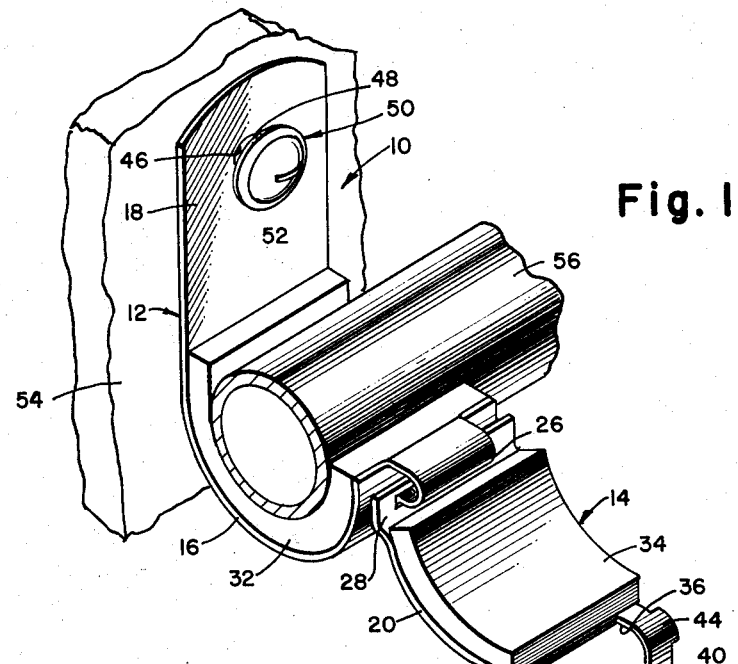

Oct. 30, 1962  B. L. KEATON  3,061,253
LINE SUPPORTING CLIP
Filed Jan. 20, 1960

INVENTOR
BOBBY L. KEATON

BY Cushman, Darby & Cushman
ATTORNEYS

United States Patent Office 3,061,253
Patented Oct. 30, 1962

3,061,253
LINE SUPPORTING CLIP
Bobby L. Keaton, Huntington, W. Va., assignor to General Metals Corporation, Adel Precision Products Division, Huntington, W. Va., a corporation of California
Filed Jan. 20, 1960, Ser. No. 3,547
4 Claims. (Cl. 248—74)

This invention relates to supports and more particularly to supporting clips of the type adapted to secure conduit to a support within an aircraft installation.

In modern day aircraft installations, there are literally thousands of conduit such as electrical lines, air pressure lines, hydraulic lines and the like, which must be effectively secured in position so that no damage will result during the extreme conditions encountered during flight. Because of weight and size considerations, such conduit often must be securely fastened at locations within the structure of the aircraft installation which are difficult to reach and are otherwise not readily accessible.

Heretofore, cushioned metal strap type supporting clips have been utilized in such aircraft installations. Such a clip usually embodies a metal strap bent to define a central loop portion of approximately three quadrants extent, a straight end portion extending tangentially from one end of the loop portion, an intermediate portion extending tangentially from the other end of the loop portion and a second end portion extending substantially perpendicularly from the intermediate portion. The loop portion has its interior surface provided with a suitable cushioning material such as rubber or the like. In operation, the end portions of the strap are moved apart by flexing the loop portion of the strap so that the strap can be moved on to the conduit between the separated end portions until the conduit is disposed within the loop portion. The end portions are provided with openings which when the end portions are moved together to secure the conduit to a support, register with each other to receive a suitable fastening element arranged to extend therethrough and to engage the support to secure the conduit supporting clip to the support with the end portions in superposed abutting relation.

It has been found that while this type of conduit supporting clip is satisfactory in most cases, where the conduit must be secured to the installation at remote or inaccessible positions the manipulations necessary to effect securement of the clip to the support are difficult to make, rendering the assembly of the installation arduous and time-consuming.

An object of the present invention is to provide a conduit supporting clip which overcomes the disadvantages noted above and renders securement of conduit in inaccessible positions of an aircraft installation easier and less time-consuming.

Another object of the present invention is the provision of a conduit supporting clip of the type described having a pair of hingedly interconnected cushioned strap sections which may be initially suspended from the support by a fastening element so that the conduit can be suspended from the clip in its open position and the clip subsequently moved into its closed position and then secured to the support.

Still another object of the present invention is the provision of a conduit supporting clip of the type described which is simple in construction and economical to manufacture.

The invention may best be understood with reference to the accompanying drawings, wherein an illustrative embodiment is shown.

Figure 2:
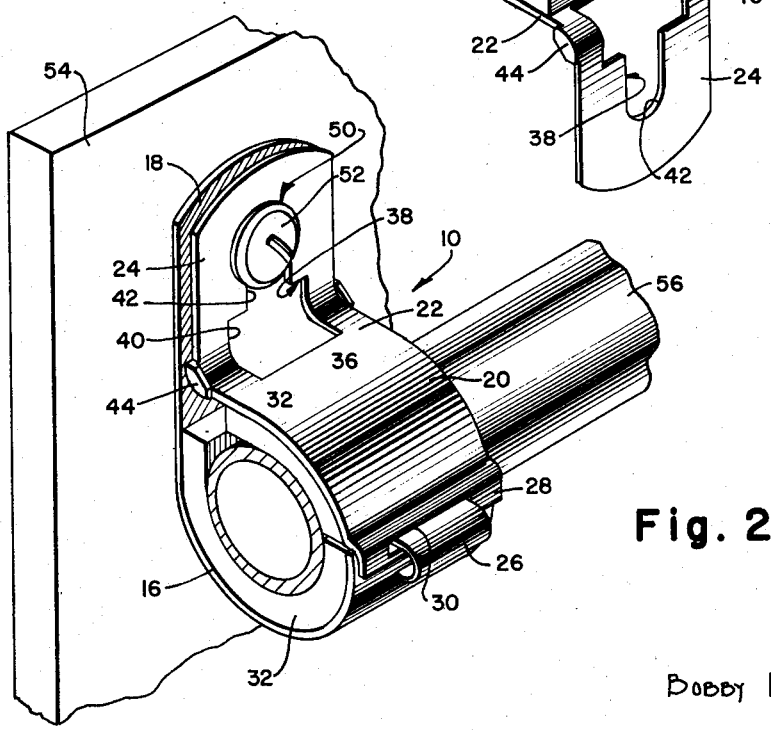

In the drawings:
FIGURE 1 is an isometric view of a conduit clip embodying the principles of the present invention, showing the clip in its open position; and
FIGURE 2 is a view similar to FIGURE 1 showing the clip in its closed position.

Referring now more particularly to the drawings, there is shown therein a conduit supporting clip, generally indicated at 10, embodying the principles of the present invention. The clip comprises a pair of hingedly interconnected cushioned strap sections 12 and 14. The strap section 12 comprises a semi-circular loop portion 16 having a straight portion 18 extending tangentially from one end thereof. The section 14 comprises an arcuate portion 20 of substantially quadrant extent, a straight intermediate portion 22 extending tangentially from one end of the arcuate portion, and a straight end portion 24 extending substantially perpendicularly from the intermediate portion 22.

The opposite ends of the semi-circular portion 16 and arcuate portion 20 are pivotally or hingedly interconnected by any suitable means about an axis parallel with the axis of the semi-circular portion 16 and disposed in a plane passing through the latter and the opposite extremity of the semi-circular portion 16. As shown, such means comprises an integral tongue 26 of a width less than the width of the strap section 12 extending outwardly from the opposite extremity of the semi-circular portion 16 in substantially perpendicular relation, then arcuately in substantially semi-circular configuration and finally, terminating in a straight extension engaging the outer periphery of the semi-circular portion 16 at a position spaced from the extremity thereof. Formed on the extremity of the arcuate portion 20 is an extension 28 which, at its connection at the extremity of the arcuate portion 20, is bent so as to be displaced from the plane of the arcuate portion a distance equal to the thickness of the strap section. Formed in the extension 28 is a rectangular opening 30 arranged to receive the bent tongue 26.

As indicated above, the strap sections 12 and 14 are cushioned and to this end, the drawings schematically illustrate a rubber cushion pad 32 fixed to the interior surface of the semi-circular portion 16 of the strap section 12 and a rubber cushion pad 34 fixed to the interior surface of the arcuate portion 20 of the strap section 14. It will be understood that the rubber cushion pads 32 and 34 are shown in the drawings for illustrative purposes only and that the straps may be cushioned with the use of any suitable cushioning material secured to the straps in any suitable manner. For example, it is common practice in the conduit supporting clip art to form the cushion of a rubberlike material having a T-shaped slot extending therethrough within which the strap is positioned. Moreover, where it is desired to provide for electrical conductivity between the conduit and the support, such rubber cushion may be interwoven with a metal strap or the cushion material may include particles which are electrically conducted. Moreover, the pad may be of sleeve configuration, either embracing portions of the strap or flat and fixed to the inner surface thereof. Such sleeves may be either of interwoven metallic wires or of textile strands, asbestos strands or strands of other suitable material.

Formed in the intermediate portion 22 of the strap section 14 intermediate the side edges of the strap section is an opening 36 having a width at least as wide as the head of a fastening element to be utilized with the clip 10 and a height at least as high as the height of such head. The opening 36 is disposed adjacent the associated attaching portion 24 and communicates with one end of an opening, generally indicated at 38, formed in the attaching portion 24. As shown, the opening 38 includes a portion 40 having a width substantially equal to the width of the opening 36 and communicating therewith. The opening 38 includes a portion 42 which extends from the portion 40 and has a width less than the latter.

In order to strengthen the strap section 14 due to any weakening effect resulting from removal of material to form the opening 36 and the opening portion 40, there is provided a pair of integral strengthening ribs 44 adjacent the junction between the intermediate portion 22 and attaching portion 24 of the strap section 14. Such strengthening ribs may be formed separately from the strap and subsequently welded thereon. However, as shown, the ribs form an integral part of the strap material and are bent into the position shown along with the other portions of the strap section 14 from flat stock.

The attaching portion 18 of the strap section 12 is provided with an opening 46, which in operation is adapted to receive a shank portion 48 of a fastening element 50 having a head 52 on one end of the shank portion.

In utilizing the present clip, as, for example, in an aircraft installation, the fastening element 50 is extended through the opening 46 and is secured within a suitable support 54. The fastening element 50 which, as shown, comprises a headed screw, is engaged within the support so that there is provided between the head 52 and the interior surface of the attaching portion 18 a space at least equal to the thickness of the strap section and preferably a little more. With the fastening element 50 thus secured to the support 54, the clip 10 will be suspended in the position shown in FIGURE 1. It will be noted that the strap section 14 depends from the strap section 12 by virtue of the hinged or pivotal connection provided by the bent tongue 26 and opening 30. This depending or open position of the strap section 14 leaves the semi-circular portion 16 of the strap section 12 unobstructed so that suitable conduit, such as pipe 56 as shown in FIGURE 1, can be simply lowered into supporting engagement with the cushion pad 32 of the semi-circular portion 16.

With the pipe or other conduit 56 initially suspended from the support by the strap section 12 and fastening element 50, the strap section 14 is then swung about the pivotal axis provided by the bent tongue 26 and extension slot 30 in a counterclockwise direction, as viewed in FIGURE 1. During this swinging movement care should be taken to swing the strap section 14 into embracing relation to the upper surface of the pipe so that the head 52 of the fastening element passes relatively through the opening 36 and the shank portion 48 of the fastening element 50 passes into the opening portion 42 with the head engaging the adjacent exterior surface of the attaching portion 24 as clearly shown in FGIURE 2. In the position shown in FIGURE 2, the clip 10 is finally secured to the support 54 in supporting relation to the pipe 56 by tightening the securement of the fastening element 50 to the support to bring the attaching portions 18 and 24 into substantially abutting superposed relation.

It can thus be seen that the present clip provides a simple and more convenient means of securing conduit to a support than with the use of conventional cushioned strap clips of the type mentioned above. With the use of conventional clips it is necessary to engage the fastening element within the support, while the attaching portions of the strap are flexibly retained apart and the conduit within the clip is unsupported. This procedure becomes quite difficult and time-consuming in aircraft installations where there is very little room within which to manipulate. With the present clip, the fastening element can be engaged with the support with only the clip suspended therefrom in the manner shown in FIGURE 1, so that the weight of the conduit does not render this securement difficult. Handling of the conduit is made simpler since a series of clips can be initially suspended from the support by fastening elements and then the conduit can be moved downwardly into supporting engagement with the semi-circular portions of the suspended strap section 12. After the conduit is thus moved into supporting relation with the strap section 12, the strap sections 14 are then pivoted into the position shown in FIGURE 2 and final securement merely requires that the fastening elements be tightened.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore this invention includes all modifications encompassed within the spirit and scope of the following claims.

I claim:

1. A conduit supporting clip comprising a first cushioned strap section having a semi-circular portion and a straight attaching portion extending tangentially from one end of said semi-circular portion, said attaching portion having an opening extending therethrough for receiving a fastening element to suspend said first strap section from a vertically extending support surface with said semi-circular portion opening upwardly, a second cushioned strap section having an arcuate portion of quadrant extent, a straight intermediate portion extending tangentially from one end of said arcuate portion and a straight attaching portion extending substantially perpendicularly from said intermediate portion, the opposite ends of said semi-circular and arcuate portions being loosely hingedly interconnected about an axis extending generally parallel to the axis of said semi-circular portion and disposed generally in a plane passing through the latter and the opposite end of said semi-circular portion whereby said second strap section is movable with respect to said first strap section between an open position wherein the upwardly facing semi-circular portion of said first strap section is unobstructed so as to receive a conduit therein when suspended by a fastening element and a closed position wherein the arcuate portion of said second strap section cooperates with the semi-circular portion of said first strap section to engage the conduit received in the latter and said attaching portions are disposed in superposed relation with respect to each other, the intermediate portion of said second strap section having an opening formed therein intermediate the side edges thereof and adjacent to the attaching portion extending therefrom, the attaching portion of said second strap section having an opening formed therein communicating at one end with said intermediate portion opening and extending along the length of said second section attaching portion a distance sufficient to register with said first section attaching portion opening when said second section is disposed in said closed position, the registering portion of said second section attaching portion opening having a width less than the width of said intermediate portion opening.

2. A conduit supporting clip as defined in claim 1 including reinforcing webs secured to the side edges of said second strap section at the junction between the intermediate and attaching portions thereof.

3. A conduit supporting clip as defined in claim 1 wherein said second strap section attaching portion opening includes a portion between the registering portion thereof and said intermediate portion opening having a width substantially equal to the width of the latter.

4. In an aircraft installation of the type described, the combination comprising: a support; conduit means; a clip embracing said conduit means; and a fastening element securing said clip to said support; said clip comprising a first cushioned strap section having a semi-circular portion and a straight attaching portion extending tangentially from one end of said semi-circular portion, said attaching portion having an opening extending therethrough, a second cushioned strap section having an arcuate portion of quadrant extent, a straight intermediate portion extending tangentially from one end of said arcuate portion and a straight attaching portion extending substantially perpendicularly from said intermediate portion, the opposite ends of said semi-circular and arcuate portions being loosely hingedly interconnected about an axis extending generally parallel to the axis of said semi-circular portion and disposed generally in a plane passing through the latter and the opposite end of said semi-circular portion, the intermediate portion of said second strap section having an opening formed therein intermediate the side edges thereof and adjacent to the attaching portion extending therefrom, the attaching portion of said second strap section having an opening extending therein along the length thereof communicating at one end with said intermediate portion opening; said fastening element including a shank portion having an enlarged head on one end thereof; said fastening element securing said clip to said support with said conduit means supportingly embraced by said semi-circular and arcuate strap section portions, said attaching portions in substantially abutting superposed relation, the exterior surface of the first strap section engaging said support above said semi-circular portion, the head of said fastening element engaging the exterior surface of said second strap section adjacent the opposite end of the opening therein, and the shank portion of said fastening element extending through the openings in said attaching portions and secured to said support; the opening in said intermediate portion having a width greater than the width of the opposite end of the opening in the associated attaching portion and at least as wide as the least transverse dimension of said fastening element head whereby said clip can be initially suspended from the support by said fastening element in a position wherein said second strap section depends from said first strap section at its hinged connection therewith and said semi-circular portion opens upwardly to supportedly receive said conduit means and then moved into its secured position by swinging said second strap section about its hinged connection so that said fastening element head passes relatively through said intermediate portion opening.

References Cited in the file of this patent
UNITED STATES PATENTS

| | | |
|---|---|---|
| 888,349 | Ogden | May 19, 1908 |
| 918,905 | Pond | Apr. 20, 1909 |
| 999,733 | Ashmore | Aug. 8, 1911 |
| 2,396,837 | Ellinwood | Mar. 19, 1946 |